UNITED STATES PATENT OFFICE 2,169,313

CONCENTRATION OF METALLIFEROUS ORES BY FLOTATION

Carl F. Williams, San Mateo, and William Trotter, San Francisco, Calif., assignors to Minerals Separation North American Corporation, New York, N. Y., a corporation of Maryland No Drawing. Application September 24, 1938, Serial No. 231,506

12 Claims. (Cl. 209—166)

The present invention relates to the art of ore concentration, but has particular reference to a flotation process of concentrating metalliferous ores.

Many organic compounds containing sulphur are known to be useful as reagents in the flotation treatment of such ores. For this purpose, for example, mercaptans, sulphides, and disulphides have been used, both of the aliphatic and aromatic types.

The process of the present invenion also employs organic compounds containing sulphur as reagents, but these differ from any of the compounds of the prior art in that they are heterocyclic compounds containing the sulphur in a ring consisting of sulphur and carbon atoms. These heterocyclic compounds form a homologous series of the general formula $C_nH_{2n}S$. Among them are included, for example, tetramethylene sulphide of the molecular formula $C_4H_8S$, pentamethylene sulphide of the molecular formula $C_5H_{10}S$, etc.

The higher members of the aforementioned series can be regarded as being derived from the lower members in either of two ways, namely, by addition of methylene groups to increase the number of carbon atoms in the ring, or by substitution of alkyl groups for hydrogen atoms attached to the carbon atoms of the ring. The reagents of the invention may thus include differently constituted compounds of the same molecular formula. For example, two compounds having the molecular formula $C_5H_{10}S$ may be represented structurally as follows:

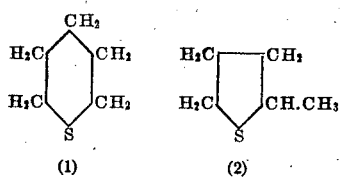

(1)      (2)

The compound represented by structural Formula 1 has one sulphur and five carbon atoms in the form of a six-membered ring, while the compound represented by structural Formula 2 has one sulphur and four carbon atoms in a five-membered ring to which is attached a methyl group.

The aforementioned heterocyclic compounds appear to have been first described by Mabery & Quayle in the American Chemical Journal (vol. 35, page 404), which authors named them thiophanes to distinguish them from thiophenes of the general formula $C_nH_{2n-4}S$, which were already known heterocyclic compounds. The best known member of this latter series is thiophene itself of the molecular formula $C_4H_4S$, which may be looked upon as an unsaturated compound. The thiophanes differ in this respect in that they are saturated compounds containing no doubly linked atoms.

Mabery & Quayle obtained thiophanes from acid products resulting from the refining of certain petroleums. This is still the principal source of these compounds, although many of them are capable of preparation in accordance with chemical reactions described in the literature.

As will be seen from the examples hereinafter given, excellent results have been obtained by the use of thiophanes as reagents in the flotation treatment of metalliferous ores. It will be further observed that these results have been obtained not only with individual members of the series, but also with mixtures of them. Moreover, in the case of mixtures produced from natural petroleum oils, it will be seen that the results are not adversely affected when such mixtures also contain quite considerable quantities of hydrocarbons.

The reagents of the invention may be used along with any others having recognized functions in flotation, i. e., frothers, pH-regulators, depressors, etc. By the use of these additional agents, the process of the invention may obviously be carried out under the best conditions. For example, while the reagents of the invention have some frothing properties, it is often preferable to use them in conjunction with separate frothers, especially when the quantity of thiophane employed is small.

The following examples are illustrative of procedures which can be used in various instances in carrying the invention into effect, it being understood that the various reagent quantities indicated in each of these examples are expressed in the usual manner in pounds per ton (2,000 lbs.) of dry ore treated.

EXAMPLE 1

A sample of copper ore from the Utah Copper Company, crushed to pass a 10-mesh screen, was reground wet in a ball mill for nine minutes with 5.0 lbs. of lime per ton of ore. By this operation the ore particles were reduced to a size such that 15.2% by weight of the original sample was plus 100-mesh. Subsequently, the material was transferred to a subaeration flotation machine and conditioned for two minutes at about 23% solids with 0.075 lb. of tetramethylene sulphide and 0.132 lb. of cresylic acid, both per ton of ore, after which a first rougher concentrate was taken off in the usual manner for three minutes. The pulp remaining in the machine was then conditioned for two minutes with another 0.075 lb. of tetramethylene sulphide per ton of ore, a second rougher concentrate being thereafter removed for five minutes. Finally, 0.15 lb. of tetramethylene sulphide per ton of ore was added to the flotation machine and, after a conditioning period of two minutes, a third rougher concentrate was taken off for five minutes. The results of the test are indicated in the following table:

|  | Percent weight | Assays percent Cu | Distribution percent Cu |
|---|---|---|---|
| Heads | 100.00 | 0.905 | 100.00 |
| Comb. concs | 3.39 | 23.57 | 88.26 |
| Tailing | 96.61 | 0.11 | 11.74 |

EXAMPLE 2

Another test was made in exactly the same way on the same copper ore, but the thiophane reagent used was pentamethylene sulphide, the quantities employed of this reagent being 0.078 lb., 0.078 lb., and 0.156 lb., all per ton, for the first, second, and third rougher concentrates, respectively. The results in this instance were as follows:

|  | Percent weight | Assays percent Cu | Distribution percent Cu |
|---|---|---|---|
| Heads | 100.00 | 0.896 | 100.00 |
| Comb. concs | 3.93 | 20.57 | 90.23 |
| Tailing | 96.07 | 0.091 | 9.77 |

EXAMPLE 3

A sample of copper ore from the New Cornelia Branch of the Phelps Dodge Corporation, crushed through 10-mesh, was reground wet in a ball mill for eight minutes with 1.0 lb. of CaO per ton of ore. This operation reduced the particles of the sample to a size such that 16.0% of its original weight was plus 65-mesh. The sample was then transferred to a subaeration flotation machine, where it was conditioned for two minutes at about 23% solids with 0.078 lb. of pentamethylene sulphide and 0.06 lb. of Yarmor pine oil, both per ton of ore. Thereafter, a froth concentrate was removed for eight minutes with the following results:

|  | Percent weight | Assays percent Cu | Distribution percent Cu |
|---|---|---|---|
| Heads | 100.00 | 1.15 | 100.00 |
| Conc | 3.73 | 24.16 | 78.26 |
| Tail | 96.27 | 0.26 | 21.74 |

*Test 3a for comparison with Example 3*

The identical procedures of Example 3 were repeated on another sample of the same copper ore, except that the pentamethylene sulphide was omitted, the results of this test being as follows:

|  | Percent weight | Assays percent Cu | Distribution percent Cu |
|---|---|---|---|
| Heads | 100.00 | 1.064 | 100.00 |
| Conc | 1.74 | 26.16 | 42.76 |
| Tail | 98.26 | 0.62 | 57.24 |

EXAMPLE 4

A sample of lead ore from the Desloge Lead Company, crushed through 10-mesh, was reground wet for seven minutes with 5.0 lbs. of $Na_2CO_3$ per ton of ore. This operation reduced the ore particles to a size such that 12.5% by weight of the original sample was plus 150-mesh. The material was then transferred to a subaeration flotation machine and conditioned for two minutes at about 16% solids with 0.116 lb. of pentamethylene sulphide and 0.2 lb. of cresylic acid, both per ton of ore, after which a froth concentrate was removed for five minutes with the following results:

|  | Percent weight | Assays percent Pb | Distribution percent Pb |
|---|---|---|---|
| Heads | 100.00 | 4.84 | 100.00 |
| Conc | 8.69 | 53.60 | 96.22 |
| Tail | 91.31 | 0.20 | 3.78 |

EXAMPLE 5

A sample of lead-zinc ore from the Eagle Picher Mining & Smelting Company, crushed to pass a 10-mesh screen, was reground wet without any added agent for five minutes to a particle size such that 15.5% of its weight was plus 65-mesh. Subsequently, the sample was conditioned in a subaeration flotation machine for two minutes at about 16% solids with 0.058 lb. of pentamethylene sulphide and 0.15 lb. of cresylic acid, both per ton of ore, after which a rougher concentrate of lead and zinc was removed for three minutes. The material remaining was then conditioned for two minutes with 1.0 lb. of copper sulphate, 0.232 lb. of pentamethylene sulphide, and 0.09 lb. of Yarmor pine oil, all per ton of ore, after which a rougher concentrate of zinc was removed for seven minutes. The results of the test are indicated in the following table:

|  | Percent weight | Assays | | Distribution percent Zn |
|---|---|---|---|---|
|  |  | Percent Pb | Percent Zn |  |
| Heads | 100.00 |  | 27.3 | 100.00 |
| Pb—Zn Conc | 1.12 | 17.50 | 21.5 | 0.88 |
| Zn conc | 43.10 | 0.17 | 62.0 | 97.89 |
| Tailing | 55.78 |  | 0.6 | 1.23 |

EXAMPLE 6

Another sample of the same lead-zinc ore as in Example 5 was processed in exactly the same manner, except that the thiophane reagent was tetramethylene sulphide, the quantities employed of this reagent being 0.056 lb. per ton for the initially obtained rougher concentrate of lead and zinc and 0.224 lb. per ton for the subsequently obtained rougher concentrate of zinc, the results in this instance being as follows:

|  | Percent weight | Assays | | Distribution percent Zn |
|---|---|---|---|---|
|  |  | Percent Pb | Percent Zn |  |
| Heads | 100.00 |  | 27.06 | 100.00 |
| Pb—Zn conc | 1.04 | 14.2 | 19.5 | 0.74 |
| Zn conc | 42.18 | 0.3 | 62.6 | 97.58 |
| Tailing | 56.78 |  | 0.8 | 1.68 |

In each of the following five examples, there was used as a reagent a petroleum derived commercial product consisting substantially of a mixture of thiophanes diluted with light hydrocarbons in the approximate amount of four to five times their weight.

Example 7

A sample of copper ore from the Nevada Consolidated Copper Corporation, crushed through 10-mesh, was reground wet in a ball mill for five minutes with 11.34 lbs. of CaO per ton of ore. This operation reduced the particle size of the sample so that 21.2% of its weight was plus 100-mesh. Subsequently, the material was transferred to a subaeration flotation machine and conditioned for five minutes at about 23% solids with 0.07 lb. of the aforementioned commercial product and 0.067 lb. of Yarmor pine oil, both per ton of ore, after which a first concentrate was taken off for eight minutes. The pulp remaining in the machine was then conditioned for two minutes with a further 0.07 lb. of the aforementioned commercial product per ton of ore, a second concentrate being then taken off for five minutes. The following results were obtained:

|  | Percent weight | Assays percent Cu | Distribution percent Cu |
| --- | --- | --- | --- |
| Heads | 100.00 | 1.192 | 100.00 |
| Comb. concs | 5.36 | 20.570 | 92.46 |
| Tailing | 94.64 | 0.095 | 7.54 |

Example 8

A sample of copper ore from the Utah Copper Company, crushed to pass 10-mesh, was reground wet in a ball mill for nine minutes with 5.0 lbs. of CaO per ton of ore. By this operation the sample was reduced to a particle size such that 15.2% of its weight was plus 100-mesh. The sample was then transferred to a sub-aeration flotation machine and conditioned for two minutes at about 23% solids with 0.174 lb. of the aforementioned commercial product and 0.12 lb. of cresylic acid, both per ton of ore, after which a concentrate was removed for eight minutes with the following results:

|  | Percent weight | Assays percent Cu | Distribution percent Cu |
| --- | --- | --- | --- |
| Heads | 100.00 | 0.891 | 100.00 |
| Conc | 2.93 | 25.76 | 84.74 |
| Tail | 97.07 | 0.14 | 15.26 |

Example 9

A sample of minus 48-mesh zinc ore from the Vinegar Hill Zinc Company was conditioned as received for six minutes in a sub-aeration flotation machine at about 16% solids with 1.5 lbs. of copper sulphate and 0.84 lb. of the aforementioned commercial product, both per ton of ore. A froth concentrate was then removed in the usual manner for six minutes, the results of the test being as follows:

|  | Percent weight | Assays percent Cu | Distribution percent Cu |
| --- | --- | --- | --- |
| Heads | 100.00 | 8.73 | 100.00 |
| Conc | 12.81 | 51.0 | 74.81 |
| Tail | 87.19 | 2.5 | 25.19 |

Example 10

A sample of lead ore from the Desloge Lead Company, crushed to pass 10-mesh, was reground wet in a ball mill for seven minutes with 5.0 lbs. of Na$_2$CO$_3$ per ton of ore. This operation reduced the size of the ore particles so that 12.5% by weight of the original sample was plus 150-mesh. The material was then transferred to a subaeration flotation machine and conditioned for two minutes at about 16% solids with 0.104 lb. of the aforementioned commercial product per ton of ore, a froth concentrate being thereafter taken off for five minutes with the following results:

|  | Percent weight | Assays percent Pb | Distribution percent Pb |
| --- | --- | --- | --- |
| Heads | 100.00 | 4.6 | 100.00 |
| Conc | 7.75 | 57.0 | 95.99 |
| Tail | 92.25 | 0.2 | 4.01 |

Example 11

A sample of zinc ore from Joplin, Missouri, crushed to pass a 10-mesh screen, was reground wet for fifteen minutes so that 18.8% of its weight was plus 100-mesh. The sample was then conditioned for four minutes in a subaeration flotation machine at about 16% solids with 1.0 lb. of copper sulphate and 0.78 lb. of the aforementioned commercial product, both per ton of ore, after which a concentrate was removed for six minutes with the following results:

|  | Percent weight | Assays percent Zn | Distribution percent Zn |
| --- | --- | --- | --- |
| Heads | 100.00 | 14.13 | 100.00 |
| Conc | 23.45 | 58.6 | 95.22 |
| Tail | 76.55 | 0.9 | 4.78 |

Example 12

In this example a copper ore was subjected to flotation in an acid circuit.

A sample of copper ore from the United Verde Copper Company, crushed through 10-mesh, was reground in a ball mill for ten minutes at 50% solids. This material was then transferred to a subaeration flotation machine, where it was conditioned for two minutes at about 16% solids with 2.0 lbs. of H$_2$SO$_4$, 0.45 lb. of tetramethylene sulphide, and 0.13 lb. of Yarmor pine oil, all per ton of ore. Thereafter, a concentrate was removed for ten minutes, the following results being obtained:

|  | Percent weight | Assays percent Cu | Distribution percent Cu |
| --- | --- | --- | --- |
| Head | 100.00 | 4.22 | 100.00 |
| Conc | 41.70 | 9.12 | 90.18 |
| Tail | 58.30 | 0.71 | 9.82 |

*Test 12a for comparison with Example 12*

Another sample of the same copper ore as in Example 12 was processed in exactly the same way, except that the tetramethylene sulphide was omitted, the test resulting as follows:

|  | Percent weight | Assays percent Cu | Distribution percent Cu |
| --- | --- | --- | --- |
| Head | 100.00 | 4.23 | 100.00 |
| Conc | 11.48 | 12.08 | 32.79 |
| Tail | 88.52 | 3.21 | 67.21 |

EXAMPLE 13

In this example a thiophane reagent was employed of the type having an alkyl group attached to the ring of sulphur and carbon atoms.

A sample of copper ore from the New Cornelia Copper Company, crushed through 10-mesh, was reground in a ball mill for eight minutes at 50% solids with 1.0 lb. of CaO per ton of ore. This material was then transferred to a subaeration flotation machine and conditioned for two minutes at 23% solids with 0.075 lb. of alpha methyl pentamethylene sulphide and 0.06 lb. of Yarmor pine oil, both per ton of ore, after which a froth concentrate was removed for eight minutes in the usual way. The results of this test were as follows:

|  | Percent weight | Assays percent Cu | Distribution percent Cu |
| --- | --- | --- | --- |
| Head | 100.00 | 1.095 | 100.00 |
| Conc | 3.65 | 23.94 | 79.77 |
| Tail | 96.35 | 0.23 | 20.23 |

It is understood that the invention is not limited to the exact procedures described in the foregoing examples, which procedures may obviously be modified in many ways without departing from the spirit of the invention.

What is claimed is:

1. A flotation process of concentrating metalliferous ores, which comprises subjecting the metalliferous ore to a flotation operation in the presence of a thiophane reagent.

2. A flotation process of concentrating metalliferous ores, which comprises subjecting the metalliferous ore to a flotation operation in the presence of an organic compound selected from the class consisting of heterocyclic compounds of the general formula $C_nH_{2n}S$ in which the sulphur is a member of the closed ring.

3. A flotation process of concentrating metalliferous ores, which comprises subjecting the metalliferous ore to a flotation operation in the presence of a thiophane of the type containing an alkyl group attached to the ring of sulphur and carbon atoms.

4. A flotation process of concentrating metalliferous ores, which comprises subjecting the metalliferous ore to a flotation operation in the presence of a reagent containing at least one organic compound of the thiophane series.

5. A flotation process of concentrating metalliferous ores, which comprises subjecting the metalliferous ore to a flotation operation in the presence of a reagent containing a plurality of organic heterocyclic compounds of the general formula $C_nH_{2n}S$ in which the sulphur is a member of the closed ring.

6. A flotation process of concentrating metalliferous ores, which comprises subjecting the metalliferous ore to a flotation operation in the presence of a reagent composed substantially of liquid hydrocarbons admixed with organic compounds of the thiophane series.

7. A flotation process of concentrating metalliferous ores, which comprises subjecting the metalliferous ore to a flotation operation in the presence of tetramethylene sulphide.

8. A flotation process of concentrating metalliferous ores, which comprises subjecting the metalliferous ore to a flotation operation in the presence of pentamethylene sulphide.

9. A flotation process of concentrating metalliferous ores, which comprises subjecting the metalliferous ore to a flotation operation in the presence of alpha methyl pentamethylene sulphide.

10. A flotation process of concentrating copper ores, which comprises subjecting the copper ore to a flotation operation in the presence of an organic compound of the thiophane series.

11. A flotation process of concentrating lead ores, which comprises subjecting the lead ore to a flotation operation in the presence of an organic compound of the thiophane series.

12. A flotation process of concentrating zinc ores, which comprises subjecting the zinc ore to a flotation operation in the presence of an organic compound of the thiophane series.

CARL F. WILLIAMS.
WILLIAM TROTTER.